US007221114B2

(12) United States Patent
Kojima

(10) Patent No.: US 7,221,114 B2
(45) Date of Patent: May 22, 2007

(54) CONVEYANCE CONTROL APPARATUS AND IMAGE FORMING APPARATUS

(75) Inventor: Hideyuki Kojima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 11/362,751

(22) Filed: Feb. 28, 2006

(65) Prior Publication Data

US 2006/0202646 A1 Sep. 14, 2006

(30) Foreign Application Priority Data

Mar. 4, 2005 (JP) ............................. 2005-061016
Feb. 22, 2006 (JP) ............................. 2006-044756

(51) Int. Cl.
*H02P 1/54* (2006.01)

(52) U.S. Cl. ........................ 318/34; 318/652; 318/602; 318/603

(58) Field of Classification Search .................. 318/34, 318/632, 638, 602, 603, 652
See application file for complete search history.

(56) References Cited

U.S. PATENT DOCUMENTS 5,711,225 A * 1/1998 Rasmussen ................. 101/483
5,940,105 A * 8/1999 Hayami ...................... 347/104

FOREIGN PATENT DOCUMENTS

| | | |
|---|---|---|
| JP | 3210164 | 7/2001 |
| JP | 2001-253132 | 9/2001 |
| JP | 2004-191845 | 7/2004 |

* cited by examiner

*Primary Examiner*—Rina Duda
(74) *Attorney, Agent, or Firm*—Harness, Dickey & Pierce, P.L.C.

(57) ABSTRACT

A conveyance control apparatus controls an amount of movement of a carrier. A first encoder detects an amount of movement of the carrier and outputting a first signal. A second encoder detects an amount of movement of a drive member driving the carrier. A control part acquires an amount of movement of the carrier by complementing an amount of movement of the carrier acquired from the first signal by an amount of movement of the drive member acquired from the second signal. The control part corrects a value representing a corresponding relationship between the first signal and the second signal based on the complemented amount of movement so as to control the amount of movement of the carrier using the corrected value.

17 Claims, 14 Drawing Sheets

CONVEYANCE CONTROL APPARATUS AND IMAGE FORMING APPARATUS

BACKGROUND OF THE INVENTION

1. Field of the Invention

The present invention generally relates to conveyance control apparatuses and, more particularly, to a conveyance control apparatus for controlling an operation of a paper conveyance apparatus used for an image forming apparatus such as a copy machine, a printer or a facsimile machine, and also relates to an image forming apparatus having such a conveyance control apparatus.

2. Description of the Related Art

In recent years, in the field of inkjet recording, ink is shifted from a dye-based ink to a pigment-based ink so as to improve light fastness and deterioration with age. Additionally, ink having a high-viscosity has become used. By using a high-viscosity ink, run or bleeding of ink on a record paper decreases drastically. However, when the high-viscosity ink is used, a displacement in landing positions of ink droplets on a recording paper becomes highly visible due to white stripes, black stripes, banding, etc. That is, inaccuracy in landing positions of ink droplets becomes visible. Especially, since the accuracy in landing positions of ink droplets depends on accuracy in a stop position of a recording paper when conveying the recording paper in a sub-scanning direction, it is desired to achieve high-accuracy in conveyance of a recording paper.

Conventionally, in a sub-scanning recording paper conveyance mechanism of an inkjet recording system, it is general to use a conveyance method using a wheel conveyance roller or a conveyance belt. In a feed control in such a conventional conveyance method, a code-wheel is attached to a conveyance roller shaft to detect a rotational position or a rotation speed of the conveyance roller shaft by reading a scale provided on the code-wheel by using an encoder sensor. Then, a feed amount of the recording paper is acquired by computation based on the detected rotational position or rotation speed so as to perform the feed amount control (for example, refer to Patent Document 1).

Patent Document 1: Japanese Laid-Open Patent Application No. 2001-253132

In the conventional paper conveyance control using the above-mentioned code-wheel, accuracy in conveyance of recording papers is influenced by eccentricity, deflection and temperature changes in the code-wheel, eccentricity and deflection in a drive pulley and the code-wheel, and variation in a thickness of a conveyance belt. That is, there is a problem that it is difficult to perform a stop position control of a recording paper with good accuracy due to accumulation of parts accuracy of a conveyance mechanism, influences of accuracy in assembling, or the like.

SUMMARY OF THE INVENTION

It is a general object of the present invention to provide an improved and useful conveyance control apparatus and image forming apparatus in which the above-mentioned problems are eliminated.

A more specific object of the present invention is to provide a conveyance control apparatus which can perform an accurate stop position control and an image forming apparatus having such a conveyance control apparatus.

In order to achieve the above-mentioned objects, there is provided according to the present invention a conveyance control apparatus for controlling an amount of movement of a carrier, the conveyance control apparatus comprising: a first encoder detecting an amount of movement of the carrier and outputting a first signal; a second encoder detecting an amount of movement of a drive member driving the carrier; and a control part that acquires an amount of movement of the carrier by complementing an amount of movement of the carrier acquired from the first signal by an amount of movement of the drive member acquired by the second signal, and corrects a value representing a corresponding relationship between the first signal and the second signal based on the complemented amount of movement so as to control the amount of movement of the carrier using the corrected value.

In the conveyance control apparatus according to the present invention, the first encoder may output a first pulse signal corresponding to an amount of movement of the carrier as the first signal; the second encoder may output a second pulse signal corresponding to an amount of movement of the drive member as the second signal; and the control part may acquire an amount of movement of the carrier by counting pulses of the first pulse signal, and complement the amount of movement acquired from the first pulse signal by counting pulses of the second pulse signal so as to acquire a ratio of a number of pulses of the first pulse signal and a number of pulses of the second pulse signal, as the corresponding relationship, within a predetermined period by using the complemented amount of movement to control the amount of movement of the carrier based on the acquired ratio.

In the above-mentioned conveyance control apparatus, the control part may include a count part and a drive control part, wherein the count part may include: a first counter counting the pulses of the first pulse signal and outputting a first count value; a second counter counting the pulses of the second counter and outputting a second pulse signal; a logic circuit counting the pulses of the second pulse signal during a period from a start of the count and until a first pulse of the first pulse signal is input and outputting a third count value, the logic circuit also counting the pulses of the second pulse signal during a period from an input of a last pulse of the first pulse signal and until the count is ended and outputting a fourth count value; and a register storing the third count value and the fourth count value, and wherein the drive control part may acquire the ratio based on a value acquired by dividing a value, which is acquired by subtracting a sum of the third and fourth count values from the second count value, by a value acquired by subtracting 1 from the first count value, and controls an amount of movement of the carrier based on the acquired ratio.

In the above-mentioned conveyance control apparatus, the first pulse signal, the second count value, a start signal for starting a count and a stop signal for stopping the count may be supplied to the logic circuit, and the logic circuit may output the third count value based on the first pulse signal, the second count value and the start signal, and also outputs the fourth count value based on the first pulse signal, the second count value and the stop signal.

In the conveyance control apparatus according to the present invention, the control part may include a count part and a drive control part, wherein the count part may include: a pulse generation part outputting, as a reset signal, a pulse corresponding to a rising part of pulse of the first pulse signal and also outputting, as a count pulse signal, pulses of the first pulse signal other than a first pulse; a first counter counting the pulses of the count pulse signal from the pulse generation part and outputting a first count value; a second counter counting the pulses of the second counter and outputting a second pulse signal; a third counter counting the pulses of the second pulse signal while being reset by each pulse of the reset signal from the pulse generation part and outputting a fourth count value; and a second register latching the fourth count value output from the third counter by a pulse generated first in the pulse generation part, and outputting the latched count value as a third count value, and wherein the drive control part acquires the ratio based on a value acquired by dividing a value, which is acquired by subtracting a sum of the third and fourth count values from the second count value, by a value acquired by subtracting 1 from the first count value, and controls an amount of movement of the carrier based on the acquired ratio.

In the above-mentioned conveyance control apparatus, the control part may include: a comparator outputting a missing signal when the fourth count value exceeds a predetermined value; and a third register latching the fourth count value by a latch pulse signal generated by a pulse of the reset signal generated first after the missing signal is output, and wherein the drive control part may acquire the ratio based on a value acquired by dividing a value, which is acquired by subtracting a sum of the third and fourth count values and the fifth count value from the second count value, by the first count value, and control an amount of movement of the carrier based on the acquired ratio.

In the above-mentioned conveyance control apparatus, the count part may further include a threshold register retaining a predetermined count value input thereto and supplying the predetermined count value to the comparator. The count part may further include: a fourth register retaining the first count value; a fifth register retaining the fourth count value; a sixth register retaining the sixth count value; a seventh register retaining the fifth count value; and an eighth register retaining the second count value, and wherein each of the fourth through eighth registers may output the count value retained therein when a data acquisition signal is supplied.

In the conveyance control apparatus according to the present invention, the control part may detect a moving speed of the carrier, and acquire the ratio by counting the pulses of the first and second pulse signals while the moving speed is constant. The control part may count the pulses of at least one of the first pulse signal and the second pulse signal, and determine that the moving speed of the carrier is constant when differences between temporally consecutive two count values are constant.

In the above-mentioned conveyance control apparatus, the control part may detect the moving speed of the carrier by measuring a period of the first pulse signal by using a predetermined clock signal.

In the conveyance control apparatus according to the present invention, the first encoder may be a reflection type optical linear encoder which generates the first pulse signal by reading optically an encoder scale attached to the carrier. The carrier may be an endless conveyance belt, and the encoder scale may be a belt scale attached over an entire part of the conveyance belt, and wherein a connection-part sensor detecting a connection-part of both ends of the belt scale may be provided so as to reset the count values when the connection-part sensor detects the connection-part when the conveyance belt is moved.

In the conveyance control apparatus according to the present invention, the second encoder may be a transmission type optical rotary encoder generating the second pulse signal by reading optically an encoder scale attached to the drive member. The carrier may be an endless conveyance belt, and the drive member may be a drive roller driving the conveyance belt, and wherein the encoder scale may be a scale formed on a disk, which is rotatable together with the drive roller by being attached to the drive roller.

In the conveyance control apparatus according to the present invention, the carrier may be an endless conveyance belt, and the drive member may be a drive roller driving the conveyance belt, and wherein the first encoder may be a reflection type optical linear encoder which generates the first pulse signal by reading optically an encoder scale attached to the carrier, and the second encoder may be a transmission type optical rotary encoder generating the second pulse signal by reading optically an encoder scale attached to the drive roller.

Additionally, there is provided according to another aspect of the present invention an image forming apparatus comprising: a conveyance control apparatus controlling an amount of movement of a carrier carrying a recording medium; and an image forming part forming an image on the recording medium being conveyed by the carrier, wherein the conveyance control apparatus comprises: a first encoder detecting an amount of movement of the carrier and outputting a first signal; a second encoder detecting an amount of movement of a drive member driving the carrier; and a control part that acquires an amount of movement of the carrier by complementing an amount of movement of the carrier acquired from the first signal by an amount of movement of the drive member acquired by the second signal, and corrects a value representing a corresponding relationship between the first signal and the second signal based on the complemented amount of movement so as to control the amount of movement of the carrier using the corrected value.

According to the present invention, an amount of movement of the carrier is acquired by complementing an amount of movement of the carrier acquired from the first signal by an amount of movement of the drive member acquired by the second signal by using both the first signal and the second signal at the same time, and a value representing a corresponding relationship between the first signal and the second signal is corrected based on the complemented amount of movement so as to control the amount of movement of the carrier using the corrected value. Thereby, even if the value representing the corresponding relationship between the first signal and the second signal at the time of design is varied, the value is corrected to be a value which represent an actual corresponding relationship, and, thus, the amount of movement of the carrier can be controlled with high-accuracy by using the corrected value.

Other objects, features and advantages of the present invention will become more apparent from the following detailed description when read in conjunction with the accompanying drawings.

DETAILED DESCRIPTION OF THE PREFERRED EMBODIMENTS

Figure 1:
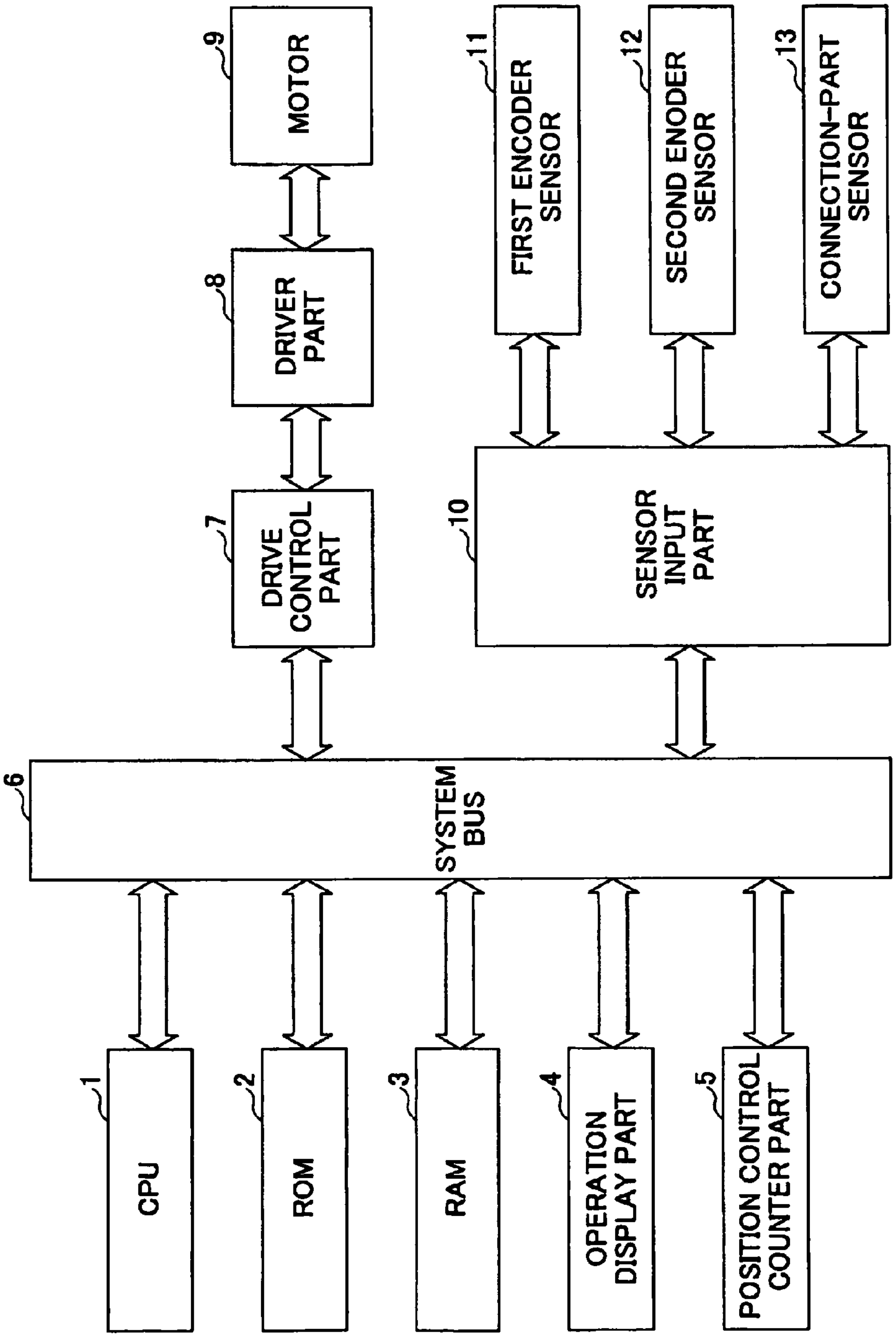
FIG. 1 is a block diagram of a conveyance control apparatus according to a first embodiment of the present invention.

The present inventor focused attention on the fact that a stop position of a recording paper can be controlled with high-accuracy if an amount of movement of a conveyance belt as a carrier, which carries the recording paper directly, is controlled with sufficient accuracy. Then the inventor considered to control an amount of movement of a conveyance belt by using both a first encoder sensor and a second encoder sensor at the same time when controlling an amount of conveyance of a recording paper, the first encoder sensor directly detecting an amount of movement of the conveyance belt in a conveyance direction, and the second encoder sensor indirectly detecting the amount of movement of the conveyance belt by using a code-wheel attached to a conveyance roller as a drive member which drives the conveyance belt as a carrier of a recording paper. The code-wheel is attached to the conveyance roller, which moves the conveyance belt, and is rotated together with the conveyance roller. An amount of movement of the conveyance belt is indirectly detected by forming a pulse period shorter than a pulse period of a first pulse signal output from the first encoder sensor by reading the scale of the code-wheel by the second encoder sensor. By using the first encoder sensor and the second encoder sensor at the same time, a detection error in an amount of movement of the conveyance belt due to eccentricity and deflection of the code-wheel or a variation in a thickness of the conveyance belt is suppressed as quickly as possible, which enables a control of an amount of movement of the conveyance belt with high-accuracy.

That is, an amount of movement of the conveyance belt is detected mainly with a low resolution by using the first encoder sensor, which has a low resolution, from a movement of the conveyance belt which directly conveys a recording paper. A portion which cannot be detected by the first encoder sensor is supplemented by the second encoder sensor having a high-resolution, thereby detecting an amount of movement of the conveyance belt with high-accuracy.

The second encoder sensor acquires the high-resolution by forming a pulse period shorter than a pulse period of the first signal output from the first encoder sensor. However, the second encoder sensor tends to generate a detection error in an amount of movement due to eccentricity and deflection of the code-wheel or a variation in a thickness of the conveyance belt since the second encoder sensor indirectly detects an amount of movement of the conveyance belt from the code-wheel, which rotates in accordance with the conveyance belt conveying a recording paper.

Thus, in the present invention, a value indicating a correspondence between a count value (first count value) of pulses of a first pulse output signal output from the first encoder sensor and a count value (second count value) of pulses of a second pulse output signal output from the second encoder sensor, that is, a ratio of the first count value and the second count value is obtained so as to control an amount of movement of the conveyance belt by using the obtained ratio. Although the ratio is set to a predetermined value when the conveyance apparatus is designed, a conveyance with high-accuracy can be achieved by controlling an amount of movement of the conveyance belt while correcting the ratio based on actual measurement values during actual use.

Explaining specifically, it is assumed that, as a design value, sixty-four (64) pulses as a number of pulses of the second pulse output signal correspond to one (1) pulse of the first pulse output signal. If the paper conveyance apparatus always maintain the relation of the design value, when the conveyance belt is to be fed by an amount of feed corresponding to 10.5 pulses as a number of pulses of the pulse output signal of the first encoder sensor, the 0.5 pulse, which is smaller than 1 pulse and cannot be detected by the first encoder sensor, is need to be detected by the second encoder sensor to feed the conveyance belt by an amount of movement corresponding to a predetermined number of pulses. Accordingly, a number of additional pulses necessary to be output from the second encoder sensor is (0.5 pulse)×(pulse ratio)=0.5×64=32. Thereby, it is found that ten (10) pulses detected by the first encoder sensor+thirty-two (32) pulses detected by the second encoder sensor should be sent.

However, in practice, the diameter of the conveyance roller may change due to variation, temperature changes, etc., and the thickness of the conveyance roller may change for each conveyance apparatus due to variation and for each use condition of the conveyance apparatus. Considering cases where the diameter of the conveyance roller is small and large, it is appreciated that an amount of feed (amount of movement) of the conveyance belt when the conveyance roller makes one rotation in the case where the diameter of the conveyance roller is large is larger than that of the case where the diameter of the conveyance roller is small. Accordingly, although the number of pulses of the second encoder sensor obtained during one rotation of the conveyance roller is constant, an amount of feed of the conveyance belt is changed. In other words, the number of pulses of the second encoder sensor required for feeding the conveyance belt for one pulse of the first encoder sensor differs according to the diameter of the conveyance roller.

Here, if it is assumed that there is a conveyance apparatus in which an amount of feed by one (1) pulse of the first encoder sensor is equal to an amount of feed by sixty (60) pulses of the second encoder sensor (pulse ratio is 1:60) due to an increase in the diameter of the conveyance roller due to a temperature change or the like although the pulse ratio of a design value is 1:64. When feeding the conveyance belt by an amount of feed corresponding to 0.5 pulse of the first encoder sensor by the apparatus, if a current accurate pulse ratio cannot be obtained, the paper feed position control is performed by using always the pulse ratio (1:64) of the design value. That is, in response to feeding the conveyance belt by an amount of movement (distance) corresponding to 0.5 pulse of the first encoder sensor, the conveyance belt is fed by an amount of movement corresponding to 0.533 pulse when converting into a number of pulses of the second encoder sensor. Accordingly, an actual amount of feed of the conveyance belt is in excess, which generates an error in the conveyance of a recording paper.

Therefore, in order to perform the feed position control of the conveyance belt with high-accuracy, it is necessary to obtain a current pulse ratio accurately during use. If the accurate pulse ratio (1:60 in the above-mentioned example) at a current time can be obtained, the feed position control can be performed with high-accuracy since (1/60)×30=0.5 pulse is obtained by feeding the conveyance belt by an amount of movement corresponding to thirty (30) pulses of the second encoder sensor so as to feed the conveyance belt by an amount of movement corresponding to 0.5 pulse of the first encoder sensor.

As mentioned above, the actual pulse ratio may differ from the pulse ratio of the design value depending on a condition of use or a condition of manufacture. For example, if the actual pulse ratio has a slight difference such as 1:63.9 or 1:64, errors in an amount of feed are accumulated, which generates a considerable feed error. Accordingly, it is important to obtain an accurate pulse ratio during actual use.

Thus, the conveyance control apparatus according to the present invention achieves a paper conveyance with high-accuracy by accurately obtaining the actual pulse ratio during paper conveyance.

A description will be given below, with reference to the drawings, of embodiments of the present invention.

(First Embodiment)

A description will now be given, with reference to FIG. 1 and FIG. 2, of a conveyance control apparatus according to a first embodiment of the present invention. FIG. 1 is a block diagram showing an outline structure of the conveyance control apparatus according to the first embodiment of the present invention.

The conveyance control apparatus shown in FIG. 1 comprises a CPU 1, a ROM 2, a RAM 3, an operation display part 4, a position control counter part (count part) 5, a system bus 6, a drive control part 7, a driver part 8, a motor 9, an encoder sensor input part 10, a first encoder sensor 11, a second encoder sensor 12, and a connected-part sensor 13.

When a conveyance belt 23 moves in a conveyance direction of the recording paper, the first encoder sensor 11 reads optically a belt scale 24 attached to the conveyance belt 23 and outputs a pulse output signal 26 (first pulse output signal) as mentioned later. The first encoder sensor 11 is a reflection type optical encoder, which reads the belt scale 24 by irradiating a light onto the belt scale 24 and detects the light reflected by the belt scale 24 so as to output a pulse signal corresponding to the belt scale 24.

The second encoder sensor 12 reads optically a rotary scale 22, which consists of slits or lines formed at a predetermined interval on a peripheral portion of a disk-shaped code-wheel 21 attached to a conveyance roller 20, which drives the conveyance belt 23, so as to output a pulse output signal 27 (second pulse output signal). The second encoder sensor 12 is a transmission type optical encoder having a resolution higher than the first encoder sensor. The second encoder sensor 12 reads the rotary scale 22 by detecting a light transmitting through the rotary scale 22 so as to output a pulse signal corresponding to the rotary scale 22.

The connection part sensor 13 detects a connection part of the belt-like belt scale 24 and a dust attached to the belt scale 24, and outputs an output signal when they are detected.

The output signals output from the above-mentioned sensors 11, 12 and 13 are supplied to the position control counter part 5 through the sensor input part 10, and converted into predetermined control signals by the position control counter part 5 and is sent to the drive control part 7. The drive control part 7 generates a PWM waveform for driving the motors 9 (for example, a DC motor, etc.) or a magnetization phase control signal of a stepping motor in accordance with the predetermined control signals, and outputs it to the driver part 8. The driver part 8 controls an operation of the motor 9 based on the signal output from the drive control part 7 so as to control an amount of movement of the conveyance belt 23.

Figure 2:
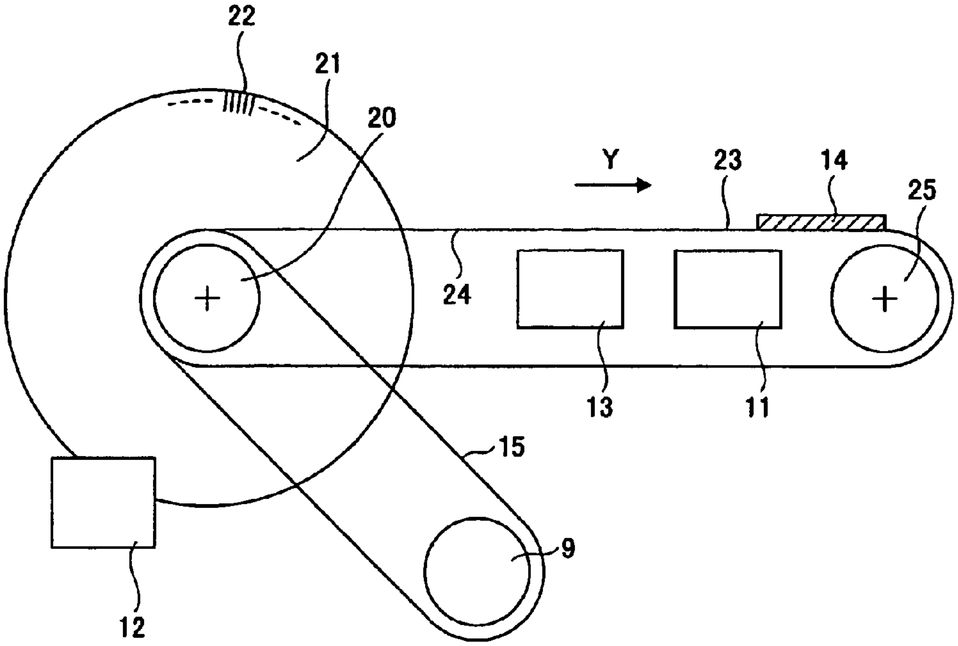
FIG. 2 is an illustrative side view of a drive part of the conveyance control apparatus according to the first embodiment of the present invention.

FIG. 2 is an illustration showing an outline of a drive system of the conveyance belt 23 according to the first embodiment of the present invention. A description will be given, with reference to FIG. 2, of the drive system of the conveyance belt 23.

The endless conveyance belt 23, which carries a recording paper 14, is engaged with the conveyance roller 20 and an idle roller 25. A drive belt 15 is engaged with the conveyance roller 20 and the motor 9 so as to rotate the conveyance roller 20 by driving the motor 9. The conveyance belt 23 is moved in a direction indicated by an arrow Y by rotation of the conveyance roller 20, and the recording paper 14 is conveyed with the movement of the conveyance belt 23.

The belt-like belt scale 24 is attached to an almost entire back surface of the conveyance belt 23 by an adhesive or the like. The belt scale 24 is an elongated belt member on which a line scale is printed by lines in silver and black or black and white at an equal interval.

The first encoder sensor 11 is mounted in the vicinity of the belt scale 24. When the conveyance belt 23 moves in the conveyance direction (Y direction), the first encoder sensor 11 reads the scale of the belt scale 24 optically, and outputs the first pulse output signal 26. The connection-part sensor 13 is located on an upstream side of the first encoder sensor in the conveyance direction Y. The connection-part sensor 13 detects that a portion of the scale of the belt scale 24 is missed due to the connection-part of the belt scale 24 or a dust adhering on the belt scale 24 or detects that the scale is not readable optically, and outputs an output signal indicating the result of detection. In the case where the connection-part sensor 13 is arranged on the upstream side of the first encoder sensor in the conveyance direction Y, the output signal of the connection-part sensor 13 is delayed so that the outputs signal is output in synchronization with a timing at which the connection-part reaches a reading part of the first encoder sensor 11.

As mentioned above, if the connection-part sensor 13 is arranged on the upstream side of the first encoder sensor 11, there is obtained an advantage in that the width of the belt scale 24 can be made small. In a case where the first encoder sensor 11 and the connection-part sensor 13 are arranged side-by-side to be located at the same position in the conveyance direction, there is no need to delay the output signal of the connection-part sensor 13.

The code-wheel 21 made of a transparent disk is attached to the conveyance roller 20 so as to rotate together with the conveyance roller 20. The rotary scale 22 having a scale made by black slits at an equal interval is provided on an entire outer circumferential part of the code-wheel 21.

The second encoder sensor 12 is mounted in the vicinity of the rotary scale 22. When the rotary scale 22 rotates with the rotation of the code-wheel 21, the second encoder sensor 12 reads the scale of the rotary scale 22 optically, and outputs the second pulse output signal 27.

The second pulse output signal 27 has a pulse period shorter than the pulse period of the first pulse output signal 26, for example, a pulse period of 1/100, and, thus, a higher resolution can be obtained.

If scales of two rows having a phase difference of 90 degrees are formed in the rotary scale 22, and when counting a number of pulses of the second pulse output signal by a second counter (counting means) mentioned later, the count can be made with higher resolution since the pulse umber can be counted by dividing by four. Additionally, by forming the scales of two rows having a phase difference of 90 degrees on the rotary scale 22, it becomes possible to detect a rotating direction of the rotary scale 22. The detection of a rotating direction (moving direction) is performed by a conventional encoder sensor and is well-known, and a description thereof will be omitted.

Figure 3:
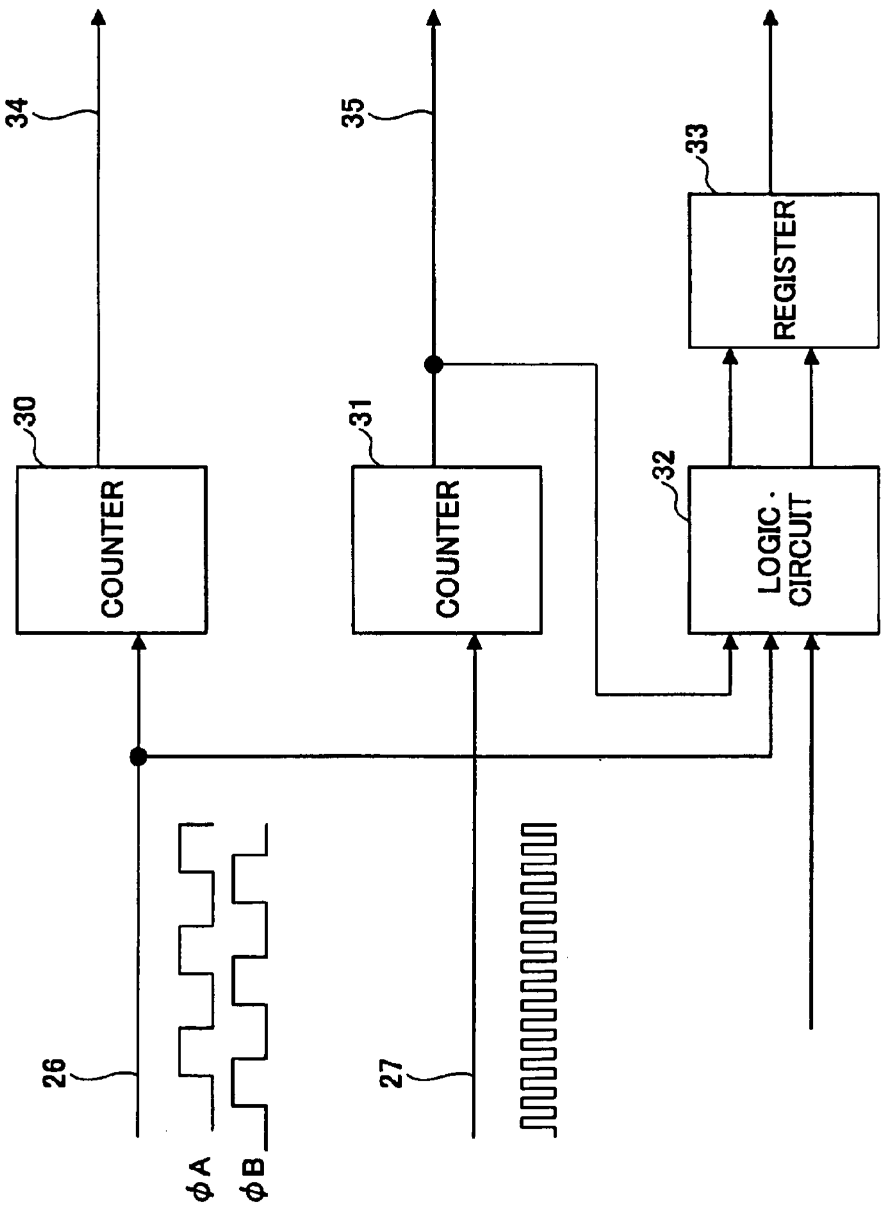
FIG. 3 is a block diagram of a position control counter part of the conveyance control apparatus according to the first embodiment of the present invention.

A description will now be given, with reference to FIG. 3 and FIG. 4, of the position control counter part 5 of the conveyance control apparatus according to the present embodiment. FIG. 3 is a block diagram of the position control counter part (count part) 5 according to the first embodiment of the present invention. The position control counter part 5 according to the first embodiment of the present invention comprises a first counter (first counting means) 30, a second counter (second counting means) 31, a logic circuit 32, and a first register (first registering means) 33 that stores a number of pulses complemented by the second encoder sensor 12.

In FIG. 3, a reference numeral 26 indicates the first pulse output signal output from the first encoder sensor 11, and a reference numeral 27 indicates the second pulse output signal output from the second encoder sensor 12. Moreover, a reference numeral 28 indicates a start signal input into the logic circuit 32 at the time of starting a count of a number of pulses, and a reference numeral 29 indicates a stop signal input into the logic circuit 32 at the time of ending the count of a number of pulses. Furthermore, a reference numeral 34 indicates a first pulse number signal representing a first pulse number (first count value) which is a count number of pulses counted by the first counter 30, and a reference numeral 35 indicates a second pulse number signal representing a second pulse number (second count value) which is a count number of pulses counted by the second counter 31.

Figure 4:
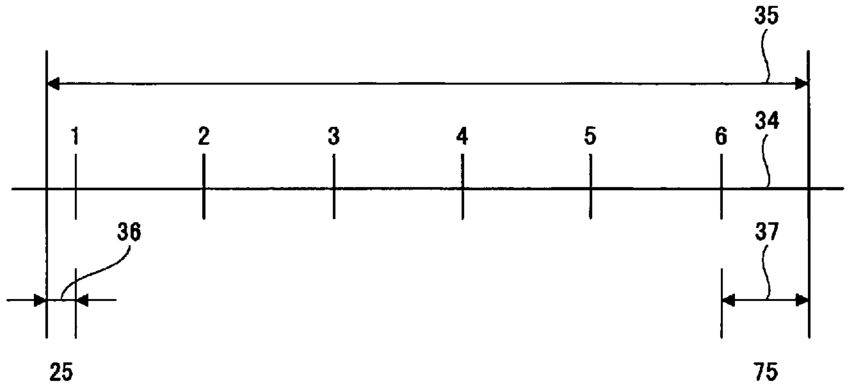
FIG. 4 is an illustration of a number of pulses output from the position control counter part shown in FIG. 3.

Additionally, in FIG. 4, a reference numeral 36 indicates a third pulse number signal representing a third pulse number (third count value), which is a count value of the pulses of the first pulse output signal 26, counted during a period from a time when the start signal 28 is input to the logic circuit 32 to a time when a first pulse signal of the first pulse signal 26 is input to the logic circuit 32, and a reference numeral 37 indicates a fourth pulse number signal representing a fourth pulse number (fourth count value), which is a count value of the pulses of the second pulse output signal 27, counted during a period from a time when a last pulse signal of the first pulse output signal 26 is input to the logic circuit 32 to a time when the stop signal is input to the logic circuit 32.

In the present invention, the above-mentioned ratio of the first pulse number and the second pulse number is obtained with high-accuracy so as to control an amount of movement of the conveyance belt by using the obtained ratio. Thus, according to the present embodiment, in order to obtain the above-mentioned ratio, the first pulse number, the second pulse number, the third pulse number and the fourth pulse number are measured within a predetermined period from a pulse count start time to a pulse count end time. In order to perform such measurements, the position control counter part 5 is configured and arranged as shown in FIG. 3.

In the position control counter part 5 shown in FIG. 3, the first pulse output signal 26 output from the first encoder sensor 11 simultaneously with the output of the start signal 28 is input into the first counter 30 and the logic circuit 32. The first counter 30 counts a pulse number of the first pulse output signal 26 within the predetermined time from the input of the start signal 28 until the input of the stop signal 29, and outputs the count value (first pulse number signal 34).

The second pulse output signal 27 output from the second encoder sensor 12 is input into the second counter 31 simultaneously with an input of the start signal 28. The second counter 31 counts a pulse number of the second pulse output signal 27 within the predetermined time from an input of the start signal 28 to an input of the stop signal 29, and outputs the count value (second pulse number signal 35).

The logic circuit 32 outputs an input signal, which causes the first register 33 to operate, within a period during which pulses are not generated by the first encoder sensor 11. The period during which pulses are not generated by the first encoder sensor 11 includes a period from an input of the start signal 28 until an input of a fist pulse of the first pulse output signal 26 and a period from an input of a last pulse of the first pulse output signal 26 until an input of the stop signal 26.

The first register 33 counts a pulse number of the second pulse output signal from the second encoder sensor 12 during a period from a count start time of the pulse number until an input of a first pulse of the first pulse output signal 26 and a period from an input of a last pulse of the first pulse output signal 26 until an input of the stop signal 29, and outputs the count value (third pulse number signal 36 and fourth pulse number signal 37).

FIG. 4 shows a relationship between the first pulse number signal 34, the second pulse number signal 35, the third pulse number signal 36 and the fourth pulse number signal 37, which are output from the position control counter part 5 shown in FIG. 3, with a horizontal axis as a time axis. For example, the first pulse number is 5, which is a result of subtraction of 1 from a total count value 6 of the first counter 30, the second pulse number is 600 since a total count value of the second counter 31 is 600, the third pulse number is 25, and the fourth pulse number is 75. In this case, a pulse number of the second pulse output signal, which the second encoder sensor 12 complements the range which cannot be counted by the first encoder sensor 11, is 25+75=100. Accordingly, the ratio of the first pulse number and the second pulse number is 1:100, which is a result of calculation (600−100)/(6−1)=100.

The drive control part 7 controls an amount of movement of the conveyance belt 23 based on the above-mentioned ratio. For example, if an amount of movement of the conveyance belt 23 is set, previously as a design value, to an amount of movement corresponding to 10.5 pulses as the first pulse number, the drive control part controls to move the conveyance belt 23 in accordance with ten (10) pulses of the first pulse output signal 26 detected by the first encoder sensor 11 and the pulse number (0.5×100=50) of the second pulse output signal 27 detected by the second encoder sensor 12, which is equal to 0.5 pulse of the first pulse number and undetectable by the first encoder sensor 11. Thereby, an amount of movement of the conveyance belt 23 can be controlled with high-accuracy.

In the present embodiment, the position control counter part 5 corresponds to a count part which counts a pulse number of the pulse signals, the drive control part 7 corresponds to a drive control part which controls an amount of movement of the conveyance belt 23 by computing the above-mentioned ratio based on count values from the count part, and the position control counter part 5 and the drive control part 7 together constitute a control part.

As mentioned above, even if the ratio of the pulse number of the first pulse output signal 26 and the pulse number of the second pulse output signal 27 varies from the setting value at the time of design due to expansion or contraction of the code-wheel 21 or expansion or contraction of the conveyance belt 23 due to temperature changes, an error generated in an amount of movement of the conveyance belt during actual use can be suppressed by obtaining the ratio periodically or immediately before use and reflecting the obtained ratio into the conveyance control. Thereby, a paper conveyance with high-accuracy can be achieved.

(Second Embodiment)

Figure 5:
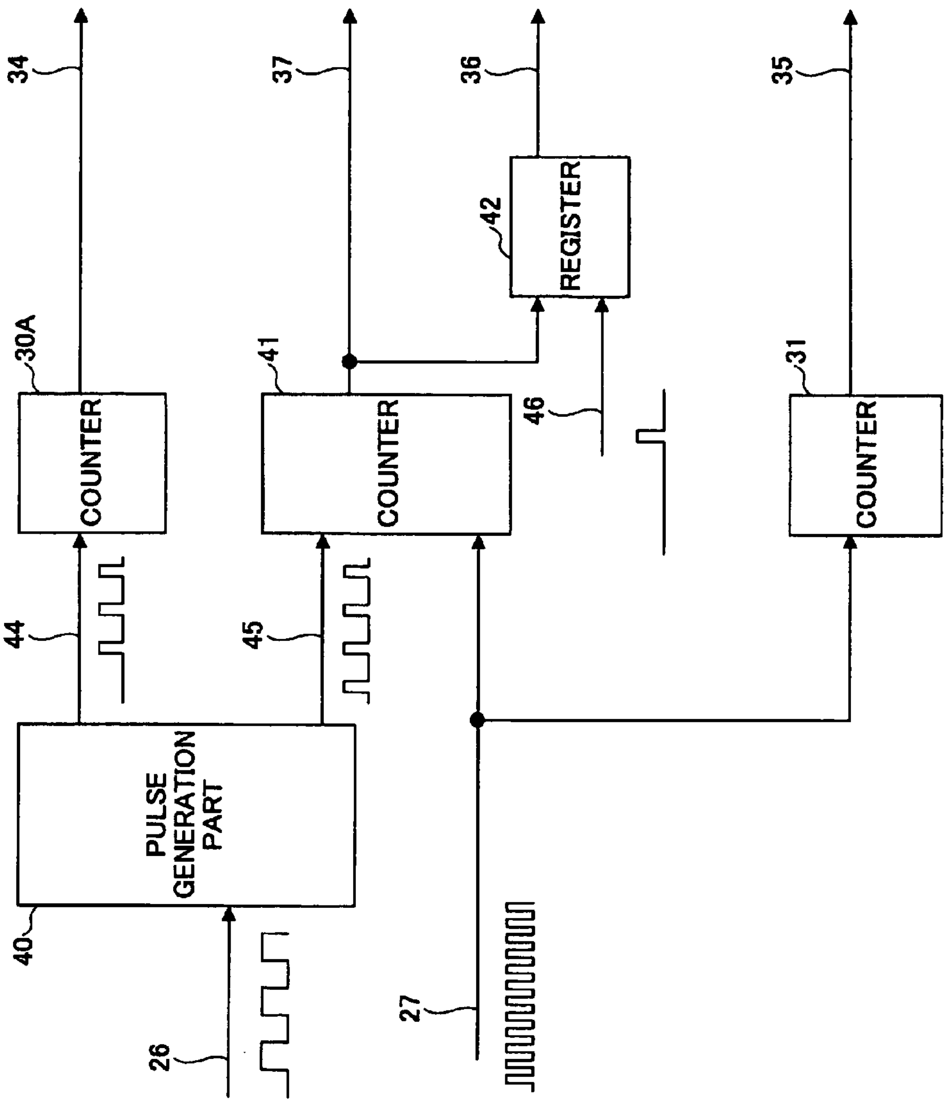
FIG. 5 is a block diagram of a position control counter part of a conveyance control apparatus according to a second embodiment of the present invention.
Figure 6:
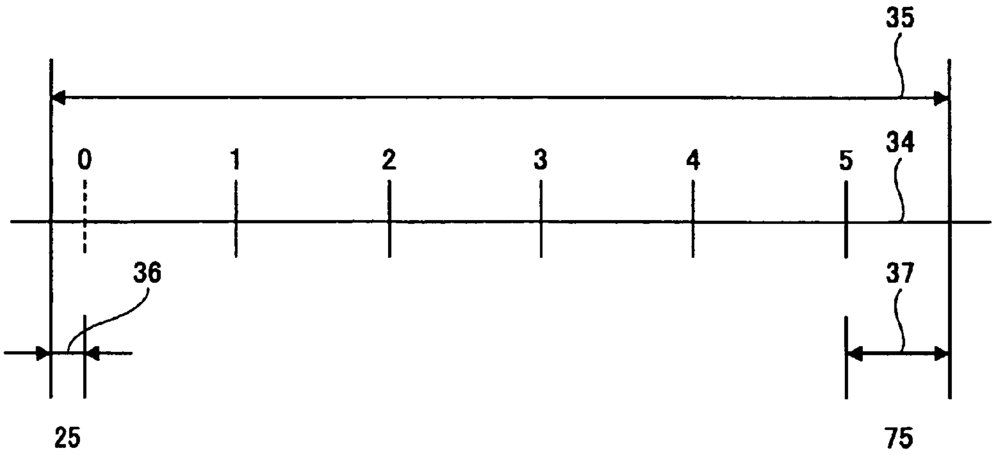
FIG. 6 is an illustration of a number of pulses output from the position control counter part shown in FIG. 5.

A description will now be given, with reference to FIG. 5 and FIG. 6, of a conveyance control apparatus according to a second embodiment of the present invention. FIG. 5 is a block diagram of the position control counter part 5 according to the second embodiment of the present invention. In FIG. 5 and FIG. 6, parts that are the same as the parts shown in FIG. 3 and FIG. 4 are given the same reference numerals, and descriptions thereof will be omitted.

As shown in FIG. 5, the position control counter part 5 according to the present embodiment comprises a pulse generation part 40, a first counter (first counting means) 30A, a third counter (third counting means) 41, a second register (second registering means) 42, and a second counter (second counting means) 31.

The pulse generation part 40 outputs a count pulse signal 44 at a rising edge of each pulse of the first pulse output signal 26, and outputs a reset pulse signal 45 also at the rising edge of the first pulse output signal 26. The first counter 30A counts the cunt pulse signal 44 and outputs the first pulse number signal 34 representing the count value. The first counter 30A in the present embodiment corresponds to the counter 30 in the first embodiment. The third counter (third counting means) 41 counts the pulses of the second pulse output signal input within a period between pulses of the reset pulse signal 45 and outputs the pulse number signal representing the count number.

The pulse number signal 37 from the third counter 41 and a first latch pulse signal, which is generated when a first reset pulse signal 45 is input to the third counter 41, are input to the second register 42. The second register 42 latches the pulse number signal 36 representing a pulse number of the second pulse output signal within a period from a count start time until an input of a first pulse of the reset pulse signal 45, and outputs the latched pulse number signal 36.

It should be noted that, similar to the above-mentioned first embodiment, the second counter 31 cumulatively counts the pulses of the pulse output signal 27 generated during a period from a start time to a stop time, and outputs the second pulse number signal representing the count number.

In the position control counter part 5 according to the present embodiment, the pulse generation part 40 generates the count pulse signal 44 from the first pulse output signal 26 by using the pulse generation part 40, and the first counter 30A generates the first pulse number signal 34 representing a pulse number within a predetermined period based on the count pulse signal 44.

On the other hand, the reset pulse signal 45 output from the pulse generation part 40 is input into the third counter 41, and the pulse number of the second pulse output signal 27 input within a period between the reset pulses. The pulse number (count value) counted is reset to zero by an input of the reset pulse signal 45, and, thus, the third counter 41 starts to count the pulse number again. As a result, the fourth pulse number signal 37, which represents a pulse number during the period from an input of a last pulse of the reset pulse signal 45 until an input of the second pulse output signal 45 is stopped by the stop signal, is output from the third counter 41.

Moreover, as mentioned above, the third pulse number signal 36, which represents the pulse number of the second pulse output signal 27 during a period from a start time until a time when the count value is reset for the first time, is output from the second register 42. Further, as mentioned above, the second pulse number signal 35 representing the cumulative pulse number of the second pulse output signal 27 is output from the second counter 31.

The ratio of the first pulse number and the second pulse number is acquired using the first pulse number signal 34, the second pulse number signal 35, the third pulse number signal 36 and the fourth pulse number signal 37. As apparent from FIG. 6, the first pulse number is 5 (the first pulse is not counted and is set to 0), the second pulse number is 600, the third pulse number is 25, and the fourth pulse number is 75. As a result of calculation $(600-(25+75))/5=100$, the ratio of the first pulse number and the second pulse number is obtained as 1:100, and thus, the ratio can be surely obtained with a simple structure.

Figure 7:
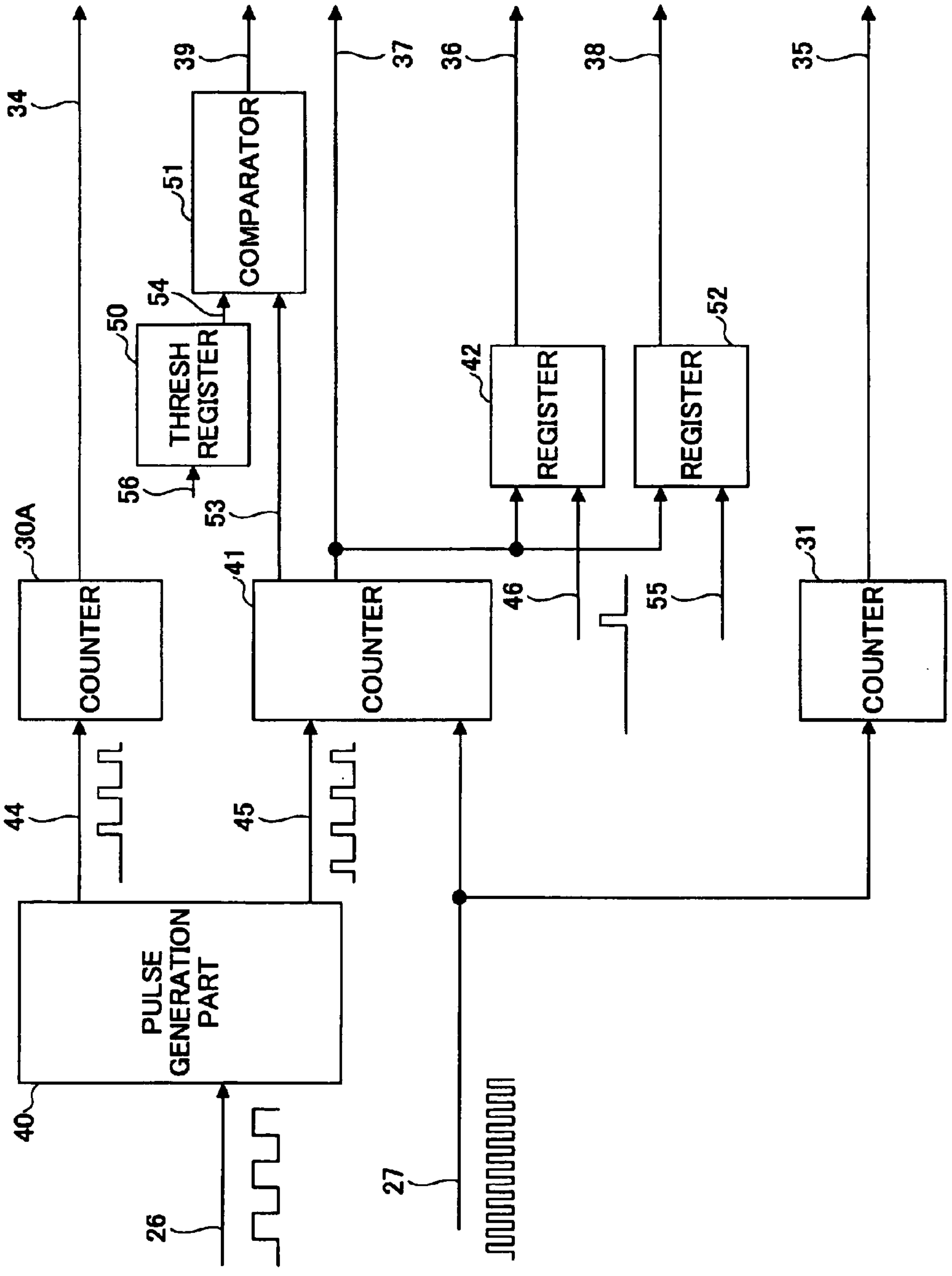
FIG. 7 is a block diagram of a position control counter part of a conveyance control apparatus according to a third embodiment of the present invention.
Figure 8:
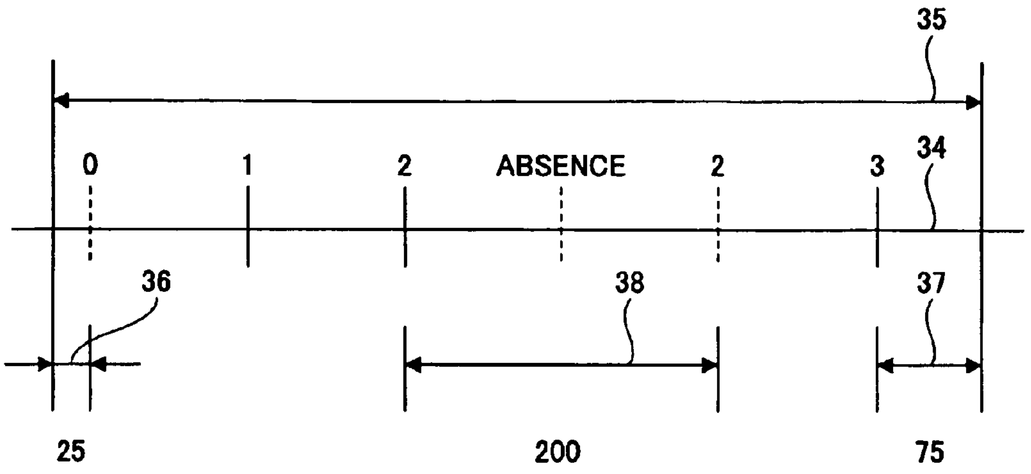
FIG. 8 is an illustration of a number of pulses output from the position control counter part shown in FIG. 7.

A description will now be given, with reference to FIG. 7 and FIG. 8, of a conveyance control apparatus according to a third embodiment of the present invention. FIG. 7 is a block diagram of the position control counter part 5 according to the third embodiment of the present invention. In FIG. 7 and FIG. 8, parts that are the same as the parts shown in FIG. 5 and FIG. 6 are given the same reference numerals, and descriptions thereof will be omitted.

The structure of the position control counter part 5 according to the present embodiment is basically the same as the structure of the position control counter part 5 according to the above-mentioned second embodiment except for a threshold register (threshold-registering means) 50, a comparator 51 and a third register (third registering means) 52 being provided.

FIG. 8 shows a relationship between the first pulse number signal 34, the second pulse number signal 35, the third pulse number signal 36 and the fourth pulse number signal 37, which are output from the position control counter part 5 shown in FIG. 7, with a horizontal axis as a time axis. In FIG. 8, a dotted line indicates that a fourth pulse is missed in the first pulse output signal 26 due to adhesion of a dust or the like.

A description will be given, with reference to FIG. 7, of the case where the fourth pulse is missed. When the first pulse output signal 26 is input to the pulse generation part 40 in the state where the fourth pulse is missed, the count pulse signal 44 and the reset pulse signal 45 of which a pulse is missed in response to the missed fourth pulse are output from the pulse generation part 40. As a result, the first counter 30A outputs the first pulse number signal 34, which represents a count value in which the missed pulse is not counted.

On the other hand, the fourth counter 41, to which the reset pulse signal 45 corresponding to the missed pulse is input, counts a pulse number of the second pulse output signal 27 during a period from an input of the third pulse of the reset pulse signal 45 and until an input of the fifth pulse (actually, the fourth pulse) of the reset pulse signal 45 and outputs a signal 53 representing the count value.

A signal which corresponds to a pulse number of, for example, 110 pulses of the second pulse output signal 27 that is previously set to the threshold register 50 is input to the comparator 51. The comparator 51 compares the above-mentioned signal 53 with the signal 54, and determines that a pulse missing has occurred in the first pulse output signal when the pulse number represented by the signal 53 exceeds the pulse number represented by the signal 54 and outputs a missing signal 39.

The third pulse number signal 37, which represents a pulse number of the second pulse output signal 27 during the period from the input of the third pulse of the reset pulse signal 45 output from the fourth counter 41 and until the input of the fourth pulse of the reset pulse signal 45, is input to the third register 52. Additionally, a second latch pulse signal 55, which is generated by the missing signal and the fifth pulse of the reset pulse signal 45, is input to the third register 52. Thereby, the third register 52 latches a signal representing the pulse number of the second pulse output signal 27 during the period from the input of the third pulse of the reset pulse signal 45 and until the input of the subsequent pulse of the reset pulse signal 45, and outputs the latched signal as a fifth pulse number signal 38.

It should be noted that the fourth pulse number signal 37, the third pulse number signal 36 and the second pulse number signal 35 in the present embodiment are the same as that explained in the above-mentioned second embodiment, and descriptions thereof will be omitted.

Additionally, a threshold value of the above-mentioned threshold register 50 can be changed, if necessary, by a signal 56 input from an external part.

As mentioned above, if a pulse missing occurs in the first pulse output signal 26, the ratio of the first pulse number and the second pulse number is calculated based on the cumulative pulse number of the second pulse output signal 27 within the predetermined period: 600 (the second pulse number), the pulse number of the first pulse output signal 26 within the predetermined period: 3 (the first pulse number), the pulse number of the second pulse output signal 26 complemented at the time of start of the operation: 25 (the third pulse number), the pulse number of the second pulse output signal 26 complemented at the time of stop of the operation: 75 (the fourth pulse number), and the pulse number of the second pulse output signal 26 complemented at the time of missing the above-mentioned signal: 200 (the fifth pulse number). The result of calculation is 600−(25+75+200)/3=100, and the above-mentioned ratio can be obtained with high-accuracy even if a signal missing occurs.

(Fourth Embodiment)

Figure 9:
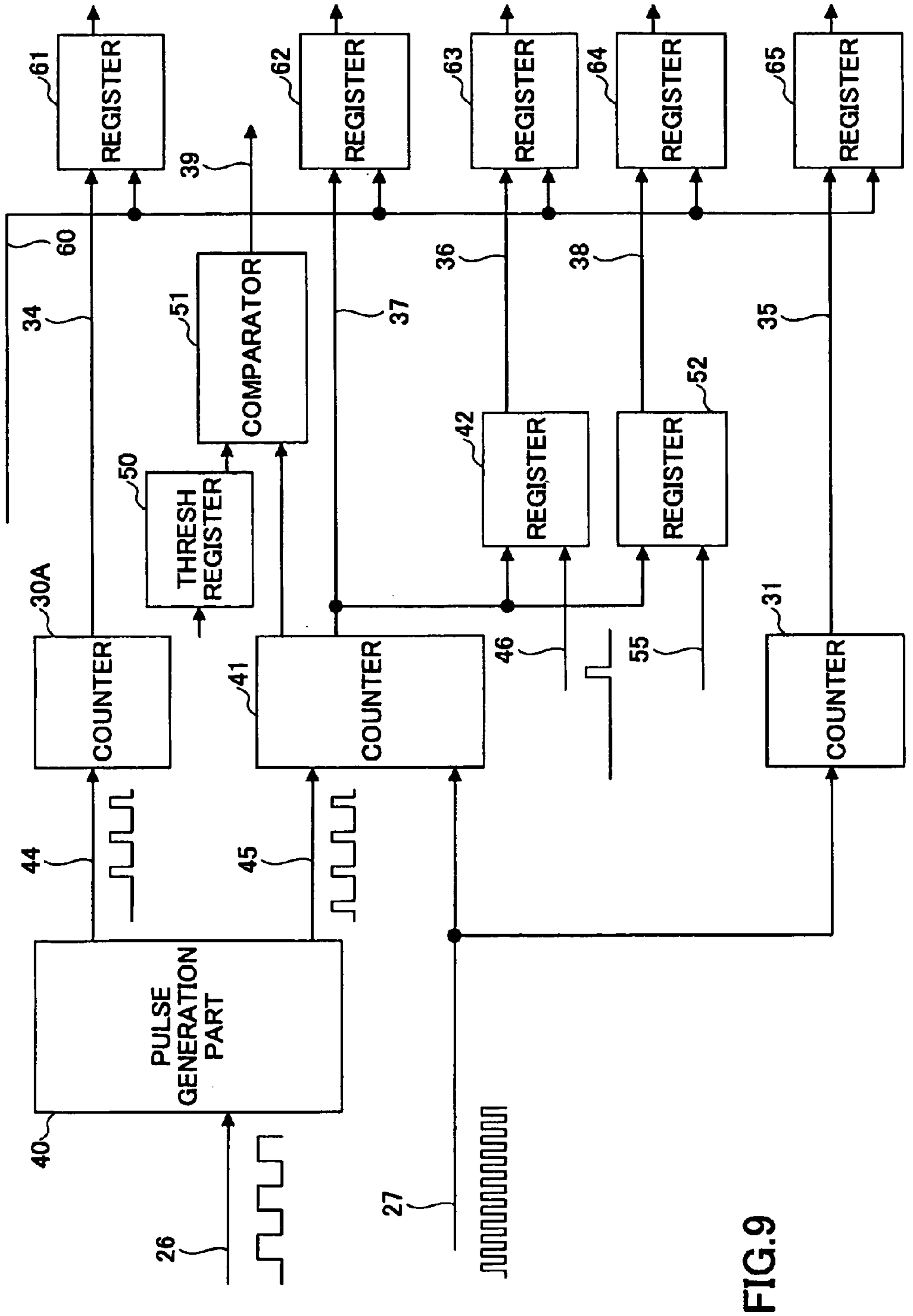
FIG. 9 is a block diagram of a position control counter part of a conveyance control apparatus according to a fourth embodiment of the present invention.

A description will now be given, with reference to FIG. 9, of a conveyance control apparatus according to a fourth embodiment of the present invention. FIG. 9 is a block diagram of the position control counter part 5 according to the fourth embodiment of the present invention. In FIG. 9, parts and signals that are the same as the parts and signals shown in FIG. 7 and FIG. 8 are given the same reference numerals, and description thereof will be omitted.

The position control counter part 5 according to the present embodiment is controlled by an input of a data acquisition signal 60. The data acquisition signal 60 is a signal which causes the conveyance belt 23 to move on a trail basis when acquiring the ratio of the pulse numbers and to start and stop the count of the pulse numbers of the first pulse output signal 26 and the second pulse output signal 27 within an appropriate predetermined period.

The structure of position control counter part 5 shown in FIG. 9 is basically the same as that of the position control counter part 5 according to the above-mentioned third embodiment. The position control counter part 5 according to the present embodiment is provided with a fourth register (fourth registering means) 61, a fifth register (fifth registering means) 62, a sixth register (sixth registering means) 63, a seventh register (seventh registering means) 64 and an eighth register (eighth registering means) 65 into which the first pulse number signal 34, the second pulse number signal 35, the third pulse number signal 36, the fourth pulse number signal 37 and the fifth pulse number signal 38 are input, respectively. By inputting the above-mentioned data acquisition signal 60 into each of the registers 61, 62, 63, 64 and 65, the first pulse number signal 34, the second pulse number signal 35, the third pulse number signal 36, the fourth pulse number signal 37 and the fifth pulse number signal 38, which are acquired during a predetermined period at substantially the same time, are output. Therefore, the ratio of the pulse numbers can be immediately acquired by inputting the data acquisition signal 60.

It should be noted that, when acquiring the ratio of the pulse numbers by moving the conveyance belt 23 on a trail basis, it is preferable to output the above-mentioned data acquisition signal 60 when the conveyance belt 23 reaches a constant speed state.

Figure 10:
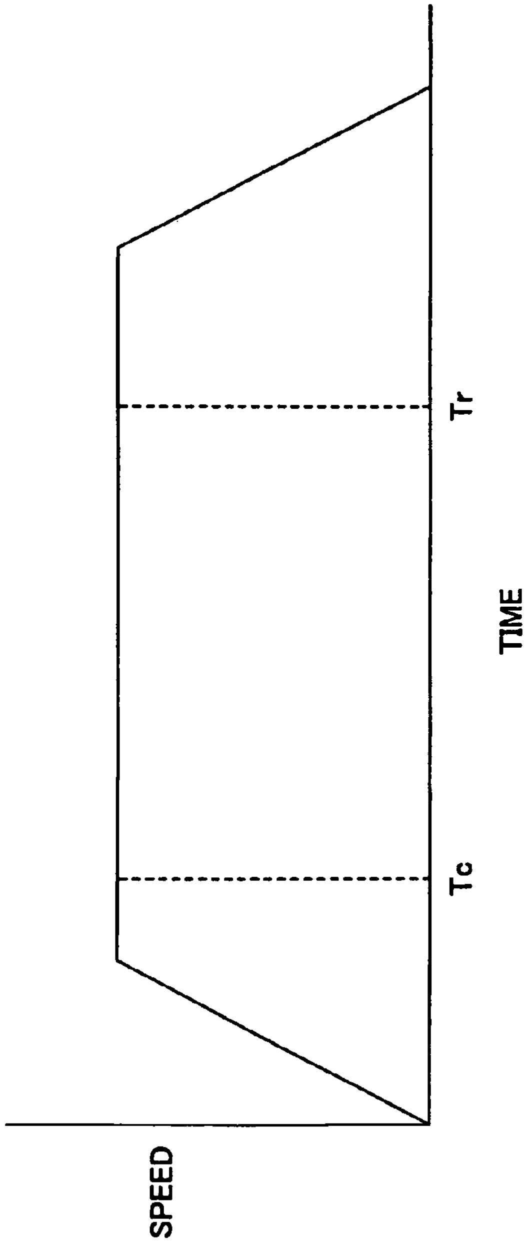
FIG. 10 is a graph showing a relationship between a speed and a time when moving a conveyance belt.

FIG. 10 is a graph showing speed changes of the conveyance belt 23 from a movement start time to a stop time. As shown in FIG. 10, the moving speed of the conveyance belt 23 is increased due to acceleration immediately after starting the moving, then, it becomes constant, and is decreased after a stop process. In the above-mentioned embodiments, the ratio of the pulse numbers can be obtained by moving the conveyance belt 23 on a trial basis before actually conveying a recording paper by the conveyance belt 23. In such a case, it is preferable to count the pulse numbers when the conveyance belt 23 is in a constant speed state. When performing this, the system is notified of the fact that the conveyance belt 23 has become a constant speed at a time Tc in FIG. 10. The system resets the counters and registers, and starts to acquire data such as the above-mentioned various pulse numbers at that time. The data within the predetermined period is taken by the registers 61, 62, 63, 64 and 65 in the third embodiment by outputting the data acquisition signal 60 in the above-mentioned third embodiment at a time Tr, at which the conveyance belt 23 has made almost a complete turn. The data taken in the registers 61, 62, 63, 64 and 65 is read by the CPU 1, and the above-mentioned ratio of the pulse numbers is obtained by computation.

As mentioned above, the data can be obtained in a state where there is no slippage generated between the conveyance roller 20 and the conveyance belt 23, which tends to occur during an acceleration by acquiring the data after the conveyance belt 23 is set to a constant speed state, and, thus, the ratio of the pulse numbers can be obtained with high-accuracy. Acquiring the data after the conveyance belt 23 is set to a constant speed state is not limited to the above-mentioned fourth embodiment, and is effective also to other embodiments.

A description will now be given, with reference to FIG. 11, of a method of detecting a speed of the conveyance belt 23.

First, the second pulse output signal 27 from the second encoder sensor 12 is read simultaneously with a start of movement of the conveyance belt 23. A cumulative pulse number at a constant time interval is counted by performing a timer interruption process so as to obtain a difference between a cumulative pulse number obtained when the current timer interruption process is performed and a cumulative pulse number obtained when the immediately preceding timer interruption process is performed. Then, it is determined that a constant speed state is reached when the difference becomes a constant number.

Figure 11:
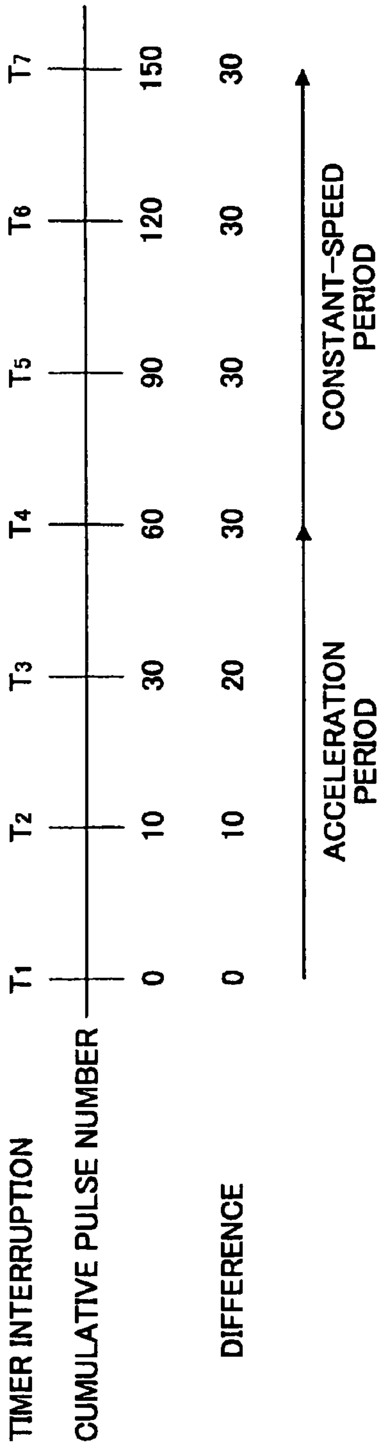
FIG. 11 is an illustration showing changes in a moving speed of a conveyance belt.

In FIG. 11, timer interruption times are indicated by T1, T2, T3, T4, T5, T6 and T7, and the cumulative pulse number (pulse count value) at each time can be obtained. A difference 10, which is a result of subtracting the cumulative pulse number: 0 at the time T1 from the cumulative pulse number: 10 at the time T2, is obtained, and, then, a difference 20, which is a result of subtracting the cumulative pulse number: 10 at the time T2 from the cumulative pulse number: 30 at the time T3, is obtained. Similarly, a difference 30, which is a result of subtracting the cumulative pulse number: 30 at the time T3 from the cumulative pulse number: 60 at the time T4, is obtained. It can be determined that a constant speed state is reached when the difference between the consecutive two count values becomes constant such as 30. Thereby, an acceleration period and a constant speed period can be easily and surely distinguishable from each other.

Figure 12:
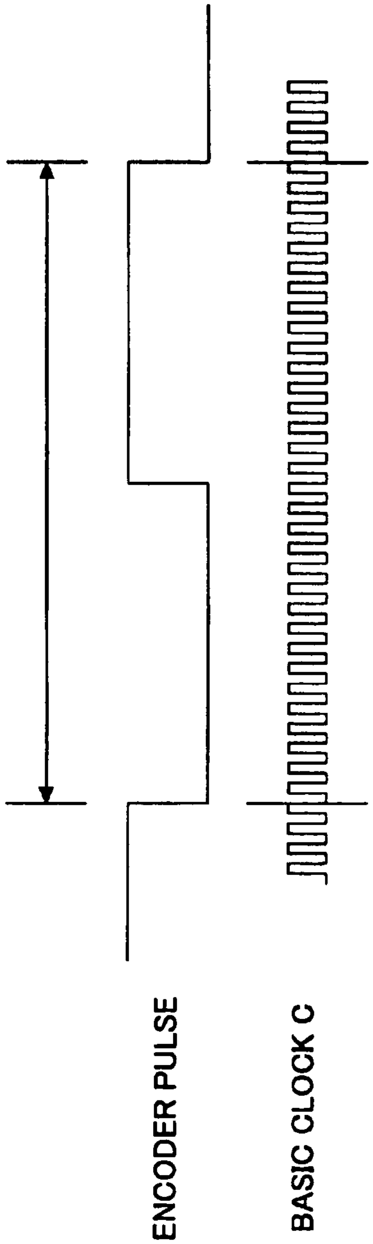
FIG. 12 is a waveform chart for explaining a method of detecting a moving speed of a conveyance belt.

Moreover, in order to detect the constant speed state of the conveyance belt 23, as shown in FIG. 12, a basic clock signal C for operating the CPU 1 and the like and the second pulse output signal 27 or the first pulse output signal 26 may be used. That is, a period length of the second pulse output signal 27 or the first pulse output signal 26 is measured by the basic clock signal C at the time of timer interruption, and it is determined that the conveyance belt 23 reaches the constant speed state when the period length of the pulse output signal becomes constant.

Moreover, when acquiring the ratio of the pulse numbers in the above-mentioned embodiments, if data of the pulse numbers is acquired at the connection-part of the belt scale 24 attached to the conveyance belt 23, there may be a case where an accurate pulse numbers cannot be acquired. Thus, the counters and registers in the above-mentioned embodiments may be reset when the connection-part of the belt scale 24 attached to the belt sensor 23 is detected by the connection-part sensor 13. That is, it is preferable to interrupt the detection of the pulse numbers in a portion of the connection-part so as to detect the pulse numbers in a portion where no connection-part exists.

Figure 13:
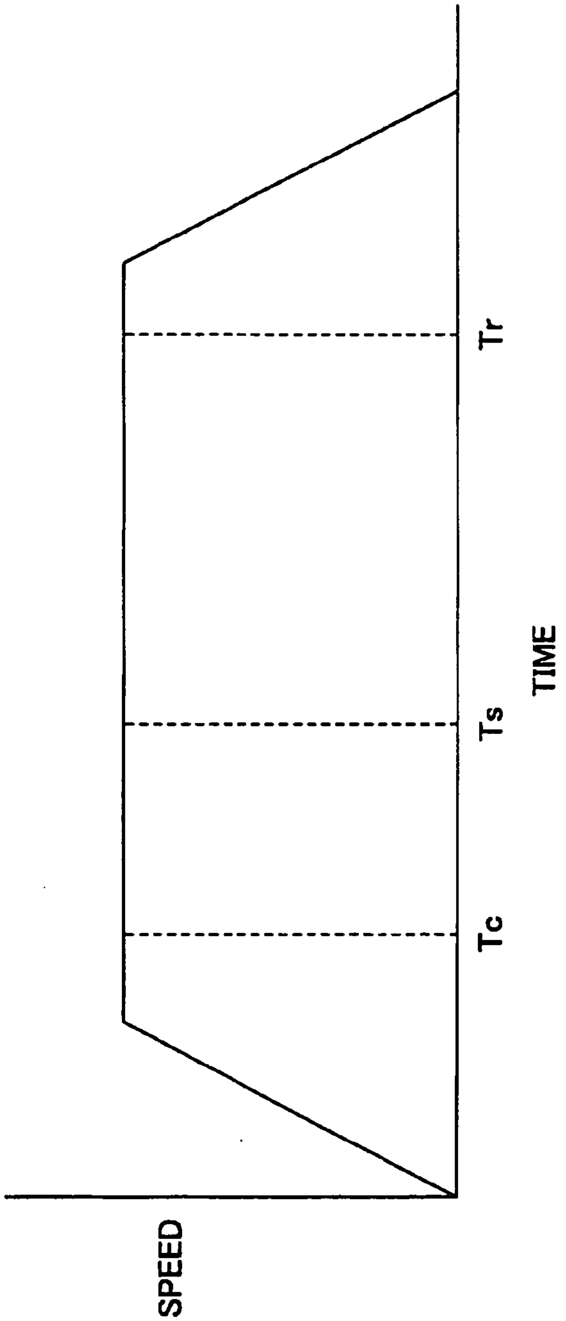
FIG. 13 is a graph showing changes in a moving speed of a conveyance belt.

FIG. 13 is a graph showing a speed of the conveyance belt 23 at a time of interrupting data acquisition in the portion of the connection-part. In FIG. 13, the system is notified of the fact that the conveyance belt 23 reaches a constant speed at the time Tc. When the connection-part is detected at the subsequent time Ts, the counters and registers in the above-mentioned embodiments are reset so as to interrupt the detection of the pulse numbers in the portion of the connection-part. Thereafter, the data acquisition signal 60 is output at the time Tr so as to acquire desired data from the registers. Thereby, deterioration of the ratio of the pulse numbers due to generation of errors at the connection-part of the belt scale 24 is prevented.

Figure 14:
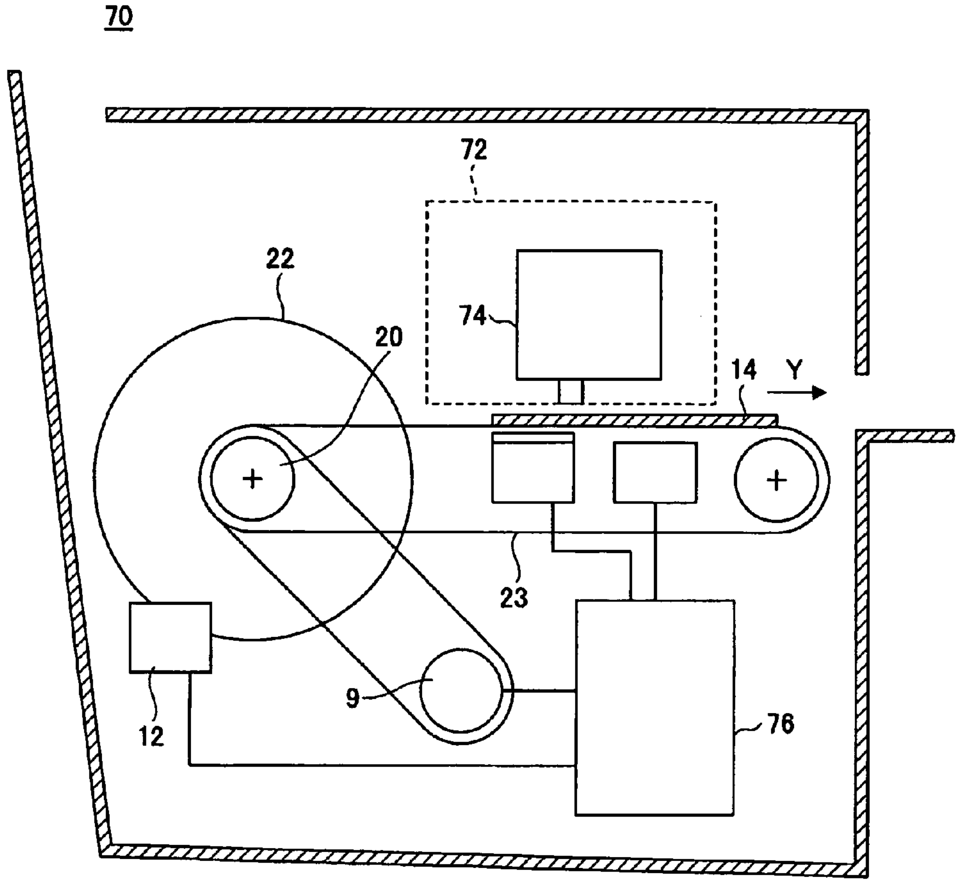
FIG. 14 is an illustration of an outline of an inkjet recording apparatus using a conveyance control apparatus according to the present invention.

The conveyance control devices explained above can be used for conveyance of recording papers in image forming apparatuses, such as, for example, an inkjet record apparatus. FIG. 14 is an illustration showing an outline of an inkjet recording apparatus using the conveyance control apparatus according to the present invention.

In the inkjet recording apparatus 70 shown in FIG. 14, ink droplets are injected onto a recording paper 14 by moving an inkjet head 74 of an image forming part 72 by a moving mechanism (not shown in the figure) while conveying the recording paper 14 in a sub-scanning direction (Y direction) with high-accuracy so as to form an image on the recording paper 14. By the conveyance control apparatus according to the present invention, the recording paper can be conveyed with high-accuracy, and, thus, the quality of the image is prevented from being deteriorated due to conveyance errors of the recording paper in the sub-scanning direction.

The conveyance control apparatus according to the present invention is applicable to image forming apparatuses such as a printer, a facsimile machine, a copy machine, etc., for office use, and particularly suitable for image forming apparatuses of an inkjet recording type.

The present invention is not limited to the specifically disclosed embodiments, and variations and modifications may be made without departing from the scope of the present invention.

The present application is based on Japanese priority applications No. 2005-061016 filed Mar. 4, 2005 and No. 2006-044756 filed Feb. 22, 2006, the entire contents of which are hereby incorporated herein by reference.

What is claimed is:

1. A conveyance control apparatus for controlling an amount of movement of a carrier, the conveyance control apparatus comprising:

a first encoder detecting an amount of movement of the carrier and outputting a first signal;

a second encoder detecting an amount of movement of a drive member driving the carrier; and a control part that acquires an amount of movement of said carrier by complementing an amount of movement of said carrier acquired from said first signal by an amount of movement of said drive member acquired by said second signal, and corrects a value representing a corresponding relationship between said first signal and said second signal based on the complemented amount of movement so as to control the amount of movement of said carrier using the corrected value.

2. The conveyance control apparatus as claimed in claim 1, wherein said first encoder outputs a first pulse signal corresponding to an amount of movement of said carrier as said first signal;

said second encoder outputs a second pulse signal corresponding to an amount of movement of said drive member as said second signal; and said control part acquires an amount of movement of said carrier by counting pulses of said first pulse signal, and complements the amount of movement acquired from said first pulse signal by counting pulses of said second pulse signal so as to acquire a ratio of a number of pulses of said first pulse signal and a number of pulses of said second pulse signal, as said corresponding relationship, within a predetermined period by using the complemented amount of movement to control the amount of movement of said carrier based on the acquired ratio.

3. The conveyance control apparatus as claimed in claim 2, wherein said control part includes a count part and a drive control part, wherein the count part includes:

a first counter counting the pulses of said first pulse signal and outputting a first count value;

a second counter counting the pulses of said second counter and outputting a second pulse signal;

a logic circuit counting the pulses of said second pulse signal during a period from a start of the count and until a first pulse of said first pulse signal is input and outputting a third count value, said logic circuit also counting the pulses of said second pulse signal during a period from an input of a last pulse of said first pulse signal and until the count is ended and outputting a fourth count value; and a register storing the third count value and the fourth count value, and wherein the drive control part acquires said ratio based on a value acquired by dividing a value, which is acquired by subtracting a sum of said third and fourth count values from said second count value, by a value acquired by subtracting 1 from said first count value, and controls an amount of movement of said carrier based on the acquired ratio.

4. The conveyance control apparatus as claimed in claim 3, wherein said first pulse signal, said second count value, a start signal for starting a count and a stop signal for stopping the count are supplied to said logic circuit, and said logic circuit outputs said third count value based on said first pulse signal, said second count value and said start signal, and also outputs said fourth count value based on said first pulse signal, said second count value and said stop signal.

5. The conveyance control apparatus as claimed in claim 2, wherein said control part includes a count part and a drive control part, wherein the count part includes:

a pulse generation part outputting, as a reset signal, a pulse corresponding to a rising part of pulse of said first pulse signal and also outputting, as a count pulse signal, pulses of said first pulse signal other than a first pulse;

a first counter counting the pulses of said count pulse signal from said pulse generation part and outputting a first count value;

a second counter counting the pulses of said second counter and outputting a second pulse signal;

a third counter counting the pulses of said second pulse signal while being reset by each pulse of the reset signal from said pulse generation part and outputting a fourth count value; and a second register latching said fourth count value output from said third counter by a pulse generated first in said pulse generation part, and outputting the latched count value as a third count value, and wherein the drive control part acquires said ratio based on a value acquired by dividing a value, which is acquired by subtracting a sum of said third and fourth count values from said second count value, by a value acquired by subtracting 1 from said first count value, and controls an amount of movement of said carrier based on the acquired ratio.

6. The conveyance control apparatus as claimed in claim 5, wherein said control part includes:

a comparator outputting a missing signal when said fourth count value exceeds a predetermined value; and a third register latching said fourth count value by a latch pulse signal generated by a pulse of said reset signal generated first after the missing signal is output, and wherein said drive control part acquires said ratio based on a value acquired by dividing a value, which is acquired by subtracting a sum of said third and fourth count values and said fifth count value from said second count value, by said first count value, and controls an amount of movement of said carrier based on the acquired ratio.

7. The conveyance control apparatus as claimed in claim 6, wherein said count part further includes a threshold register retaining a predetermined count value input thereto and supplying the predetermined count value to said comparator.

8. The conveyance control apparatus as claimed in claim 7, wherein said count part further includes:

a fourth register retaining said first count value;

a fifth register retaining said fourth count value;

a sixth register retaining said sixth count value;

a seventh register retaining said fifth count value; and an eighth register retaining said second count value, and wherein each of said fourth through eighth registers outputs the count value retained therein when a data acquisition signal is supplied.

9. The conveyance control apparatus as claimed in claim 2, wherein said control part detects a moving speed of said carrier, and acquires said ratio by counting the pulses of said first and second pulse signals while the moving speed is constant.

10. The conveyance control apparatus as claimed in claim 9, wherein said control part counts the pulses of at least one of said first pulse signal and said second pulse signal, and determines that the moving speed of said carrier is constant when differences between temporally consecutive two count values are constant.

11. The conveyance control apparatus as claimed in claim 9, wherein said control part detects the moving speed of said carrier by measuring a period of said first pulse signal by using a predetermined clock signal.

12. The conveyance control apparatus as claimed in claim 2, wherein said first encoder is a reflection type optical linear encoder which generates said first pulse signal by reading optically an encoder scale attached to said carrier.

13. The conveyance control apparatus as claimed in claim 12, wherein said carrier is an endless conveyance belt, and said encoder scale is a belt scale attached over an entire part of the conveyance belt, and wherein a connection-part sensor detecting a connection-part of both ends of said belt scale is provided so as to reset said count values when said connection-part sensor detects said connection-part when said conveyance belt is moved.

14. The conveyance control apparatus as claimed in claim 2, wherein said second encoder is a transmission type optical rotary encoder generating said second pulse signal by reading optically an encoder scale attached to said drive member.

15. The conveyance control apparatus as claimed in claim 14, wherein said carrier is an endless conveyance belt, and said drive member is a drive roller driving the conveyance belt, and wherein said encoder scale is a scale formed on a disk, which is rotatable together with the drive roller by being attached to the drive roller.

16. The conveyance control apparatus as claimed in claim 2, wherein said carrier is an endless conveyance belt, and said drive member is a drive roller driving the conveyance belt, and wherein said first encoder is a reflection type optical linear encoder which generates said first pulse signal by reading optically an encoder scale attached to said carrier, and said second encoder is a transmission type optical rotary encoder generating said second pulse signal by reading optically an encoder scale attached to said drive roller.

17. An image forming apparatus comprising:

a conveyance control apparatus controlling an amount of movement of a carrier carrying a recording medium; and an image forming part forming an image on the recording medium being conveyed by said carrier, wherein said conveyance control apparatus comprises:

a first encoder detecting an amount of movement of the carrier and outputting a first signal;

a second encoder detecting an amount of movement of a drive member driving the carrier; and a control part that acquires an amount of movement of said carrier by complementing an amount of movement of said carrier acquired from said first signal by an amount of movement of said drive member acquired by said second signal, and corrects a value representing a corresponding relationship between said first signal and said second signal based on the complemented amount of movement so as to control the amount of movement of said carrier using the corrected value.

* * * * *